United States Patent
Guo et al.

(10) Patent No.: US 12,141,671 B2
(45) Date of Patent: Nov. 12, 2024

(54) METHODS AND SYSTEMS FOR GENERATING PREDICTIONS BASED ON TIME SERIES DATA USING AN ENSEMBLE MODELING

(71) Applicant: THE BANK OF NEW YORK MELLON, New York, NY (US)

(72) Inventors: Hongshan Guo, New York, NY (US); Yu Yu, New York, NY (US); Sahil Goel, New York, NY (US); Lin Wang, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 905 days.

(21) Appl. No.: 17/205,890

(22) Filed: Mar. 18, 2021

(65) Prior Publication Data
US 2022/0300860 A1    Sep. 22, 2022

(51) Int. Cl.
*G06N 20/20*    (2019.01)
*G06F 17/18*    (2006.01)

(52) U.S. Cl.
CPC ............. *G06N 20/20* (2019.01); *G06F 17/18* (2013.01)

(58) Field of Classification Search
None
See application file for complete search history.

(56) References Cited

U.S. PATENT DOCUMENTS

| | | | | |
|---|---|---|---|---|
| 10,402,733 B1* | 9/2019 | Li | ........................... | G06N 20/20 |
| 11,227,226 B2* | 1/2022 | Chen | ........................ | G06N 7/01 |
| 2017/0188823 A1* | 7/2017 | Ganesan | ................. | A61B 3/113 |
| 2019/0080257 A1* | 3/2019 | Chen | .......................... | G06N 5/04 |
| 2019/0114554 A1* | 4/2019 | Chen | ....................... | G06N 20/10 |
| 2019/0392323 A1* | 12/2019 | Yan | .......................... | G06N 3/082 |
| 2020/0285984 A1* | 9/2020 | Bejjam | ..................... | G06N 5/04 |
| 2020/0357059 A1* | 11/2020 | Kennedy | ................ | G06N 20/20 |
| 2022/0147816 A1* | 5/2022 | Yanagisawa | ............. | G06N 3/04 |

OTHER PUBLICATIONS

Extended European Search Report dated Aug. 26, 2022, issued in corresponding European Patent Application No. 22162960.3 (10 pgs.).
Andre Gensler et al., "Probabilistic Wind Power Forecasting: A Multi-Scheme Ensemble Technique With Gradual Cooperative Soft Gating", 2017 IEEE Symposium Series on Computational Intelligence (SSCI), IEEE, Nov. 27, 2017, pp. 1-10, XP03331205.
Stephen Haben et al., "A Hybrid Model of Kernel Density Estimation and Quantile Regression for GEFCom2014 Probabilistic Load Forecasting", arxiv.org, Cornell University Library, 201 OLIN Library Cornell University Ithaca, NY 14853, Oct. 17, 2016, pp. 1-9.

* cited by examiner

*Primary Examiner* — Haimei Jiang
(74) *Attorney, Agent, or Firm* — Pillsbury Winthrop Shaw Pittman, LLP (57) ABSTRACT

The methods and systems provide an ensemble approach that combines multiple single-model-solutions to produce optimal forward-looking forecasts. Moreover, the methods and systems provide an architecture for this ensemble approach that ensures that the limitations for individual ensemble model components are compensated by other ensemble model components as inputs and outputs from ensemble model components are fed from one ensemble model component to another in a specific order to generate a final output upon which a conservative prediction is based.

18 Claims, 7 Drawing Sheets

METHODS AND SYSTEMS FOR GENERATING PREDICTIONS BASED ON TIME SERIES DATA USING AN ENSEMBLE MODELING

BACKGROUND

Computers may be used to perform modeling and simulation techniques to simulate and study complex systems. In some instances, the modeling and simulation techniques may be applied to time series data. Time series data is a collection of observations obtained through repeated measurements over time. Time series data may be linear or non-linear, and models and simulations built upon time series data presents unique challenges. For example, time series data may display serial dependence. Serial dependence occurs when the value of a datapoint at one time is statistically dependent on another datapoint in another time. Additionally, time series data may relate to a group of observations on a single entity over time or may relate to a group of observations of multiple entities at a single time. Accordingly, any modeling and simulation techniques used to simulate and study these systems must maintain the relationships between the data and values within the data.

SUMMARY

Accordingly, methods and systems are described herein for generating predictions based on time series data. Notably, the methods and systems describe herein maintain the relationships between the data and values within the data, as well as provide for novel functionality and predictive capabilities. Specifically, the methods and systems described herein allow for the generation of predictions based on time series data that is subject to conservative predictions.

For example, conservative predictions may be applicable to a plurality of scenarios where a prediction is subject to a maximum over-estimation and/or threshold frequency of over-estimation ranging from health care supply chains to energy grid utilization. However, in conventional systems, the application of conservative predictions is thought to be a business problem, and these systems address it using human judgement and expertise-specific intuition to make conservative predictions. Not only are such methods labor-intensive and subject to judgement and entry errors, but these systems require large buffers to account for their inherent inaccuracies. In contrast to this conventional thinking, the methods and systems herein address the shortfalls in conventional systems, not as a business problem, but as a modeling and simulation problem. For example, as described herein, the methods and systems address the technical problem of why conventional modeling techniques fail to provide accurate conservative predictions, and provide a technical solution comprising a novel machine learning architecture that address this technical problem. In particular, the machine learning architecture provides these technical solutions through a novel selection of ensemble model components (and in novel formats) as well as a determination of what hyperparameters to tune.

Specifically, the methods and systems describe an ensemble-based machine learning approach that provides accurate, yet conservative predictions based on time series data. Furthermore, as opposed to a machine learning model that is trained to make accurate predictions and then has a conservative constraint applied to the prediction (e.g., decrease the predicted amount by five percent), the ensemble-based machine learning described herein is specifically trained, through a unique architecture, to generate the conservative prediction itself. Moreover, the methods and systems described herein compensate for the shortfalls determined by selected ensemble model components when those models are conservatively constrained.

For example, the ensemble-based machine learning model may comprise a constant downward shift on regression-based forecasts. In such cases, creating a systematic shift with point-estimates allows mean-centered predictions to be moved downwards, thus creating conservative estimates. However, this presents a new technical challenge in that the shift amount needs to satisfy historical maximum over-estimation constraints, which means the model needs to be shifted down significantly due to occasional large over-estimations. To compensate for this, the output of a regression model featuring a constant downward shift may be combine with the output of another ensemble model component, such as one with a dynamic downward shift. For example, in an ensemble model component with a dynamic downward shift, new predictions are provided on a rolling basis, and the system modifies a lower bound to point estimates by subtracting a standard deviation of a recent subset of the time series data according to a particular magnification. However, this creates a new modeling challenge, as both determining the right amount of magnification and ensuring that the accuracy is not excessively sacrificed for the sake of not over-estimating is difficult.

In another example, the ensemble-based machine learning model may comprise an ensemble model component that performs a quantile regression. For example, a quantile-regression-based loss function generates a confidence interval based on a quantile-loss function with pre-defined quantiles between 1 and 100%, which allows for the creation of predictions within a confidence interval. However, the quantile regression presents its own technical problem, as coverage of confidence interval decreases when large fluctuations/volatilities occur, which reflects adversely on the performance of predictive modeling. In yet another example, the ensemble-based machine learning model may comprise an ensemble model component that performs a regression with asymmetric loss function. An asymmetric loss function generates a conservative estimate based on losses that are not symmetric and can shifted to either the upper or lower end of estimates by changing the signs. However, this ensemble model component also creates a technical challenge, as it is not able to control the overestimation for certain data points, even with large penalties.

In view of these technical challenges, the methods and systems herein provide an ensemble approach that combines multiple single-model solutions to produce optimal, forward-looking forecasts. Moreover, the methods and systems provide an architecture for this ensemble approach that ensures that the limitations for individual ensemble model components are compensated by other ensemble model components as inputs and outputs from ensemble model components are fed from one ensemble model component to another in a specific order to generate a final output upon which a conservative prediction is based.

In some aspects, the systems and methods for using an ensemble machine learning model to generate reliably conservative predictions based on time series data are described herein. For example, the system may receive a first feature input, wherein the first feature input represents a first set of times series data. The system may input the first feature input into a first ensemble model component and a second ensemble model component, wherein the first ensemble model component is a mean-based regression model, and wherein the second ensemble model component is a quantile regression model. The system may receive a first output from the first ensemble model component and a second output from the second ensemble model component. The system may generate a second feature input based on the first output and the second output. The system may input the second feature input into a final ensemble model component to determine a final output, wherein the final ensemble model component comprises a plurality of ensemble model components used to generate predictions subject to a conservative constraint. The system may generate for display, on a user interface, a prediction based on the final output.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Figure 1:
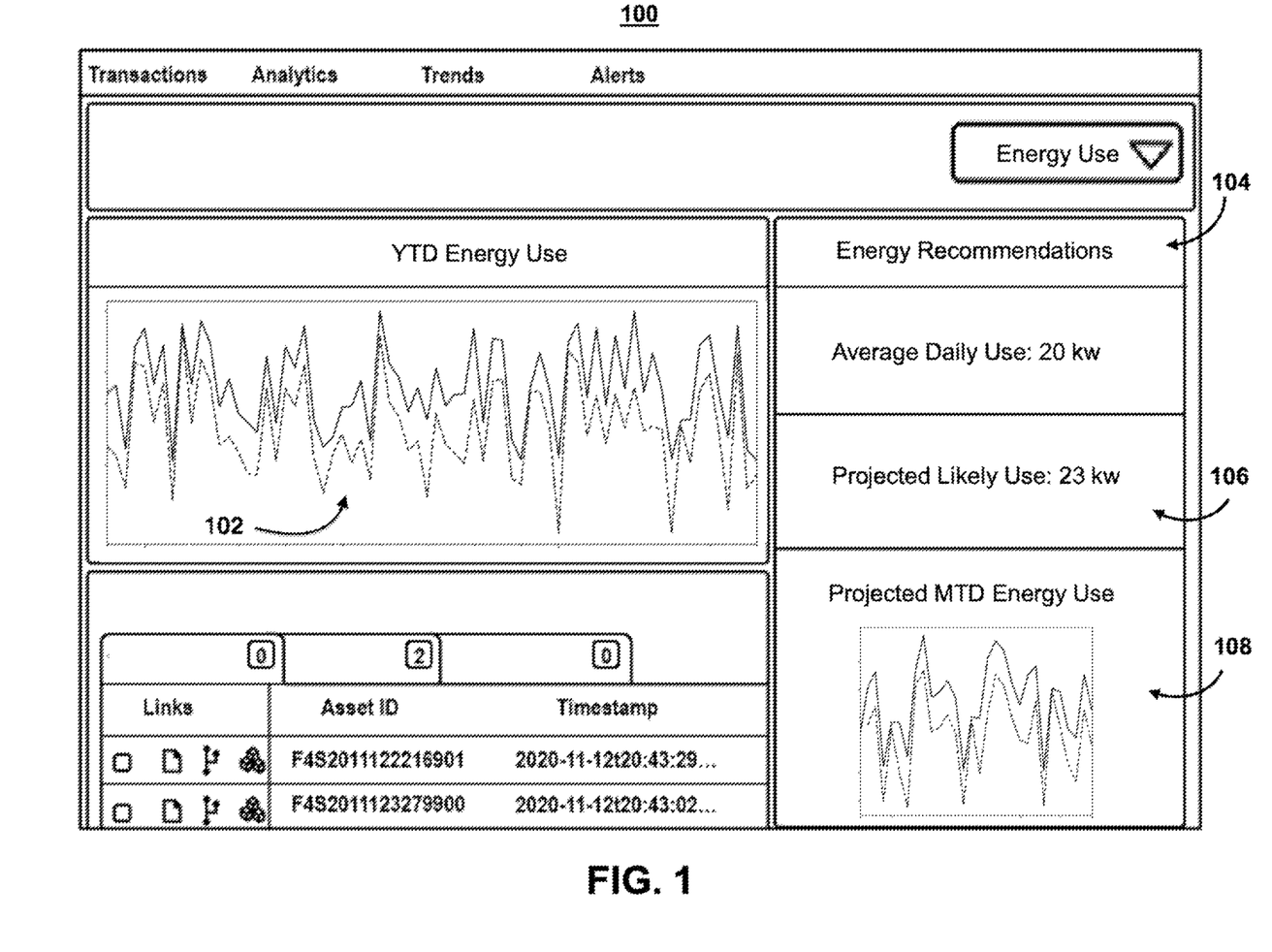
FIG. 1 depicts a user interface for generating reliably conservative predictions based on time series data in energy use embodiments, in accordance with an embodiment.

FIG. 1 depicts a user interface for generating reliably conservative predictions based on time series data in energy use embodiments, in accordance with an embodiment. For example, FIG. 1 depicts user interface 100 that generates predictions using machine learning models that generate cluster-specific temporal representations for time series data, in accordance with an embodiment. For example, as carbon and energy-cost awareness has been on the rise, many utilities companies have introduced projected energy usage for household utility portals which is meant for end-users to be aware of their own energy footprints. These predictions are meant to serve as the mental baselines for the end-users, as they are incentivized when they achieve savings by implementing various energy-saving tactics during their everyday life. These predictions for current and/or future use require accuracy, which is essential to build up confidence from the end-users.

For example, user interface 100 may monitor time series data (e.g., time series data 102) and may generate a prediction summary (e.g., for prediction class 104) that includes one or more predictions (e.g., prediction 106 and prediction 108). The one or more predictions may indicate changes and/or irregularities in time series data 102. For example, the predication may include recommendations and/or information about a value of time series data in the future. User interface 100 may also indicate other information about time series data. The one or more predictions may also include a rationale and/or information regarding why a prediction was triggered (e.g., the one or more metrics and/or threshold differences that caused the prediction). As referred to herein, a prediction may include any communication of information that is communicated to a user. For example, a prediction may be any communication that conveys information in a quantitative or qualitative manner, include values, rates of change, and/or differences in value as well as danger, threats, or problems, typically with the intention of having it avoided or dealt with. Similarly, a prediction may be any communication that conveys an opportunity and/or recommends an action.

For example, having adequate demand response in data centers (e.g., relates to network processes, energy use, data transmission/communication) is vital to the operation of data center demand response management. If the demand response may be planned and distributed across an entire day, the system is uniquely positioned to respond to use renewable energy resources whose supplies are intermittent throughout the day. To ensure continuous operation of data centers utilizing solar energy, the data centers must ensure enough solar energy is stored when immediate solar is not available is important).

For example, the systems and methods may generate predictions (e.g., indicating abrupt changes, likely changes, and/or other discrepancies in one or more values) based on changes of a metric (e.g., a value associated with time series data). The predictions may be applied to multiple embodiments (e.g., any embodiments featuring time series data).

Figure 2:
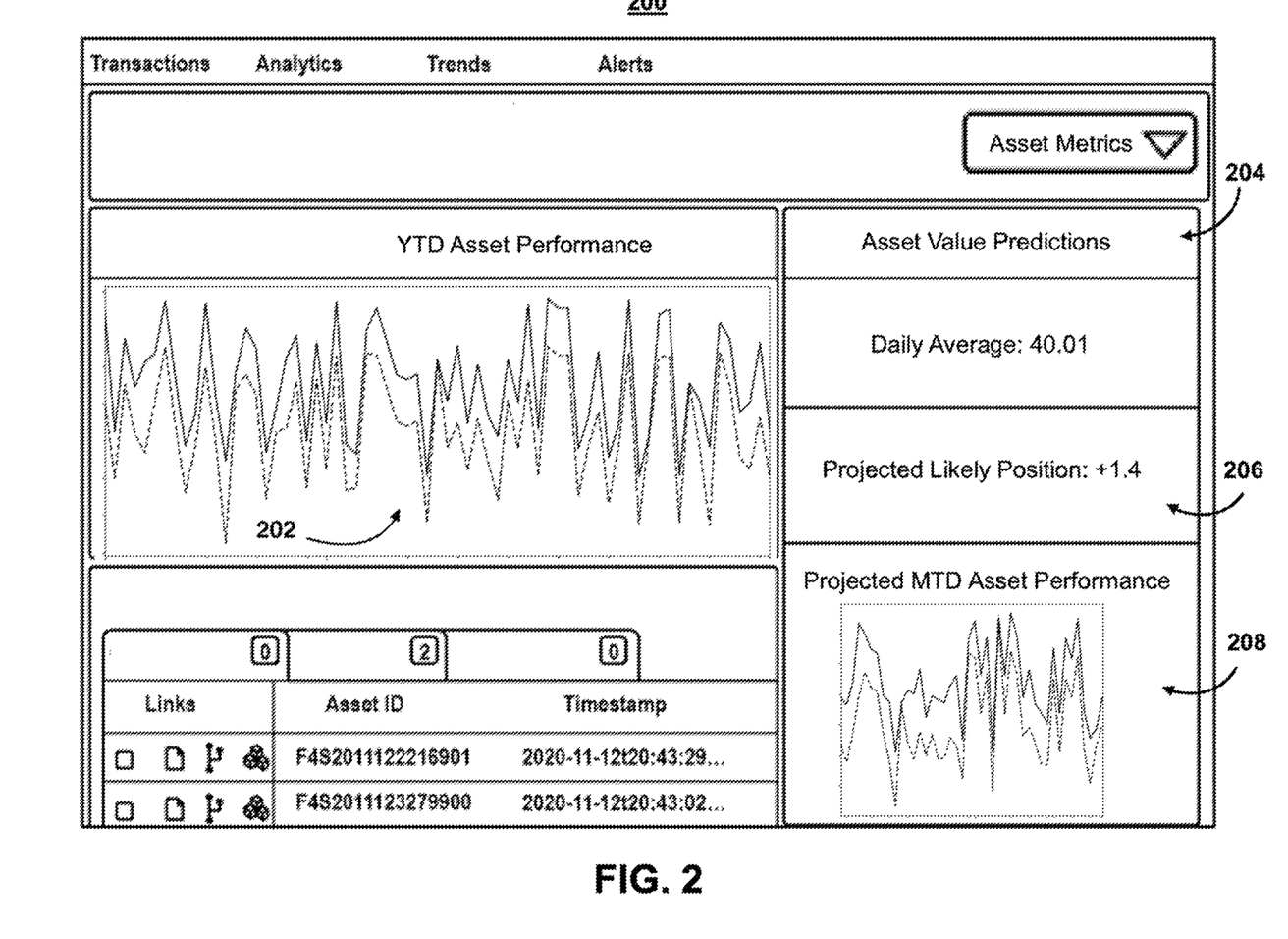
FIG. 2 depicts a user interface for generating reliably conservative predictions based on time series data in financial services embodiments, in accordance with an embodiment.

FIG. 2 depicts a user interface for generating reliably conservative predictions based on time series data in financial services embodiments, in accordance with an embodiment. For example, FIG. 2 depicts user interface 200 that generates predictions using machine learning models that generate cluster-specific temporal representations for time series data, in accordance with an embodiment. For example, the ability to accurately predict future cash and liquidity is highly important for banks and their clients. Effective cash forecasting results in efficient use of capital, reducing funding costs and lowering risk. The complexity of cash forecasting, however, is a challenge due to the number of variables and/or lack of predictable forecasting methods. This solution will be very helpful for such problems. User interface 200 may present predictions for intraday trading of financial assets and/or other financial services. For example, user interface 200 may monitor time series data (e.g., time series data 202) and may generate a prediction summary (e.g., for prediction class 204) that includes one or more predictions (e.g., prediction 206 and prediction 208). The one or more predictions may indicate changes and/or irregularities in time series data 202. For example, the predication may include recommendations and/or information about a value of time series data in the future. For example, the system may present current and/or future predictions for the value of an asset. User interface 200 may also indicate other information about time series data. The one or more predictions may also include a rationale and/or information regarding why a prediction was triggered (e.g., the one or more metrics and/or threshold differences that caused the prediction).

In another example, the embodiments described herein may be used for loan assessment, lease financing, and/or other collateral based financing embodiments. For example, when creating a leasing contract, the estimation of resale value of the item involved (e.g., car) is very important: over-estimation of resale value will result in lowered leasing value and losses for the automobile company in the long run. Having accurate yet conservative resale prices of cars is therefore very important at the time of lease-signing, since accurate estimations will win the company reputation, while conservative estimation ensures the company does not see losses due to over-estimations of resale values.

It should be noted that the embodiments described herein may be applied to numerous technical areas and/or technical problems. For example, delivery services, supply chain, and/or food delivery/ride-share platforms both have the need to estimate the arrival times of their deliveries where accurate—and preferably shorter time estimations will obviously attract more customers. This creates a new challenge on the social welfare of the drivers who ended up competing with the best (fastest) case scenario predictions made from historical (earlier rides) and real-time data (e.g., GPS, traffic and weather). The delivery platforms therefore face the challenge where they need predictions that are accurate enough to keep attracting customers, and conservative enough to not nudge the drivers to attempt to rush through traffic. Accordingly, embodiments described herein may generate reliably conservative predictions based on time series data in delivery service and/or supply chain embodiments.

For example, for supply chain optimization, the common costs incurred include the total transportation, pipeline inventory, and plant inventory costs, where accurate prediction beforehand can significantly reduce operational cost across the board. However, as over-estimation of demand could incur additional inventory costs and transportation costs, having a conservative lower bound is equally important as an accurate prediction. Similarly, for logistics companies, added route-executing time in response to other jobs requiring time creates constraints on the system. In another example, the main challenge faced by any retail store is predicting sales in advance and keeping inventory to reduced levels without hurting sales when opportunity arises, and as the prior curbs inventory costs and the latter accrues profit, a conservative business strategy will clearly favor under-stocking and therefore be a biased solution. Similarly, hospitals, as well as the wider pharmaceutical industry, are highly incentivized to optimize their inventory to reduce waste, cost and shortages, and therefore need to ensure the drug inventory is conservative enough for day-to-day operation instead of facing as many over-stocking days as under-stocking days.

In another example, the embodiments described herein may be used for assessing civil engineering, natural disasters, and/or public works. For example, predicting the remaining time before a civil engineering failure, natural disaster, and/or public works issue is crucial to mitigate the consequences of these occurrences. For example, with respect to a natural disaster, accurate predictions may help emergency response teams to plan and respond to the evacuations and rescue plans. In another example, with respect to a civil engineering failure, accurate predictions may help plan and allocate a budget prior to a failure. Avoiding over-estimations with conservative estimates is also imperative as it may threaten the lives of civilians and first-responders while under-estimation could mean that there is less time to plan and execute rescue which will likely only lead to property damage.

Figure 3:
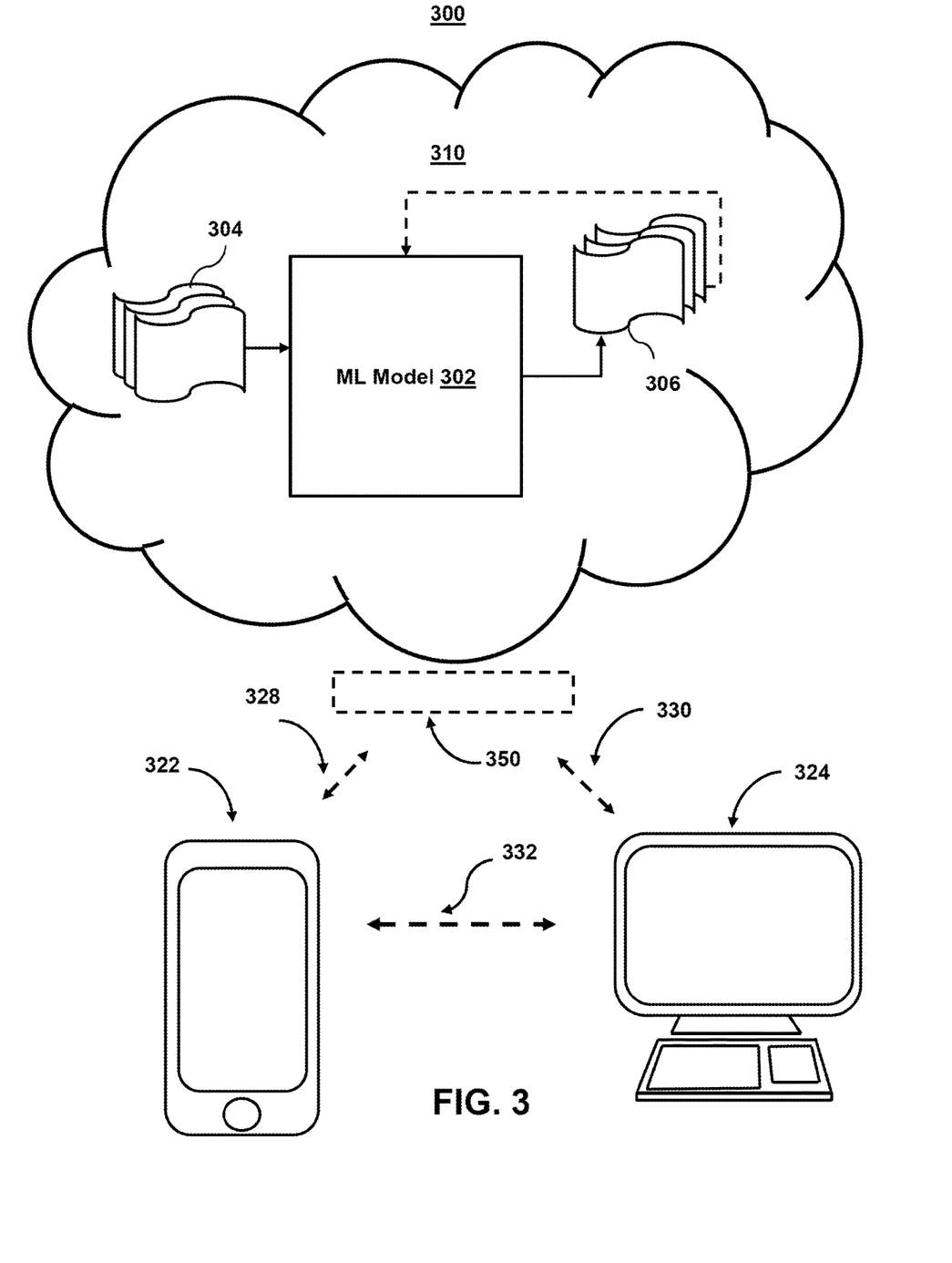
FIG. 3 depicts an illustrative system for generating reliably conservative predictions based on time series data, in accordance with an embodiment.

FIG. 3 depicts an illustrative system for generating reliably conservative predictions based on time series data, in accordance with an embodiment. For example, system 300 may represent the components used for generating reliably conservative predictions based on time series data, as shown in FIGS. 1-2. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. For instance, users may utilize one or more devices to interact with one another, one or more servers, or other components of system 300. It should be noted, that, while one or more operations are described herein as being performed by particular components of system 300, those operations may, in some embodiments, be performed by other components of system 300. As an example, while one or more operations are described herein as being performed by components of mobile device 322, those operations, may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., notifications).

Additionally, as mobile device 322 and user terminal 324 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating alternative content.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or collectively include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may also include model 302, which may be a machine learning model and/or an artificial intelligence model (e.g., as described herein collectively). For example, the machine learning model may be an ensemble machine learning model. The ensemble machine learning model may itself comprise one or more ensemble model components, which may themselves be machine learning models and/or ensemble machine learning models. Model 302 may take inputs 304 and provide outputs 306. The inputs may include multiple datasets such as a training dataset and a test dataset. Each of the plurality of datasets (e.g., inputs 304) may include data subsets related to time series data. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction. The system may then train an ensemble machine learning model (or one or more ensemble model components) to classify inputted data structures to known predictions. For example, the ensemble machine learning model may categorize time series data to generate predictions as described in FIG. 4.

In another embodiment, model 302 may update its configurations (e.g., weights, biases, or other parameters) based on the assessment of its prediction (e.g., outputs 306) and reference feedback information (e.g., user indication of accuracy, reference labels, or other information). In another embodiment, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302 and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., times series predictions).

The system may use multiple methods for training the ensemble machine learning model and/or one or more components of the ensemble machine learning model. As a threshold technical problem, the system may need to train these models and/or components in environments in which training data is sparse. Accordingly, the system may use cross-validation resampling in order to generate a threshold amount of training data. For example, the system may receive a feature input, wherein the feature input represents a set of time series data for training the models and/or components. The system may then generate a plurality of samples based on cross-validation resampling of the set of time series data. For example, the system may split an available dataset into training and test sets based on random sampling (e.g., ⅓ for test and ⅔ for training purposes). The system may then use an algorithm and create and train a model (e.g., as described in FIG. 4 and otherwise herein). The system may fit the model using training data and/or apply hyperparameters as necessary. The system may then evaluate the trained model using test data.

To increase the training data available, the system may use cross-validation methods to provide a more robust evaluation of models. For example, the system may split the dataset into multiple training and test sets and run the evaluation multiple times (e.g., train the ensemble machine learning model based on the plurality of samples).

In some embodiments, the system may use K-fold cross-validation by splitting the data into k subsets (called folds). The system then trains the model and/or model component using all but one of the folds. The model is then evaluated using the unused fold, which acts as the test set. This system may repeat this process, keeping a different fold back as the test set each time. On completion, the system has trained and evaluated the model k times. The system may then compute an overall evaluation score by taking the mean of the k scores. In this way, the system receives a more robust evaluation of the models. Moreover, the model and/or components are less susceptible to being poorly evaluated due to random sampling.

System 300 also includes API layer 350. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End layers. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
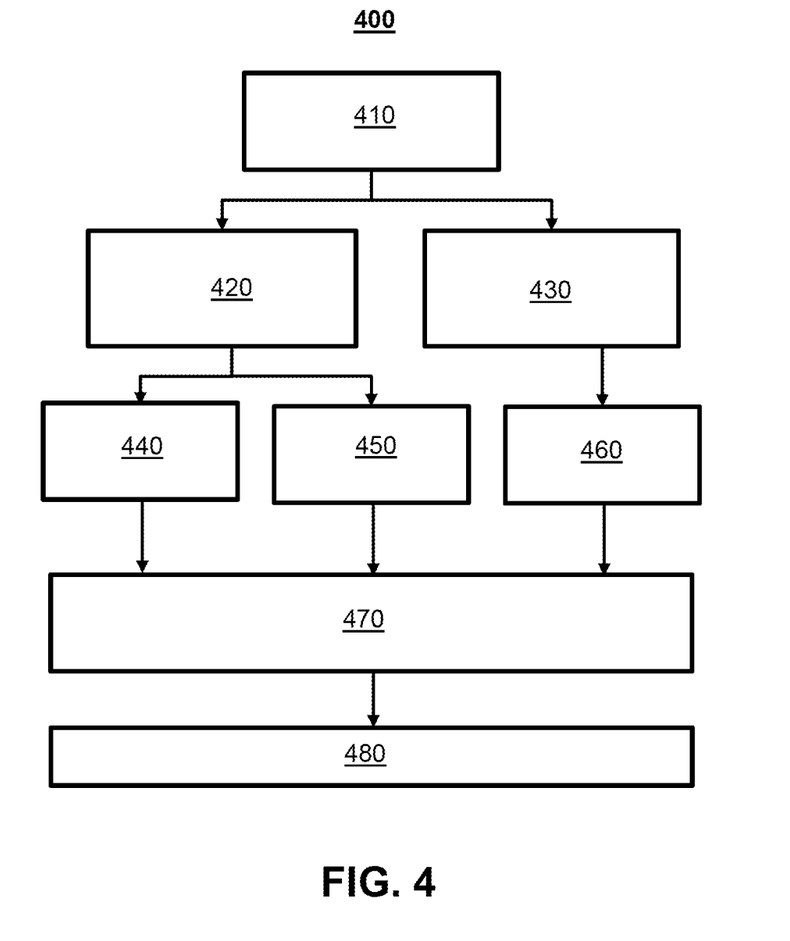
FIG. 4 depicts an illustrative architecture for a machine learning model for generating reliably conservative predictions based on time series data, in accordance with an embodiment.

FIG. 4 depicts an illustrative architecture for a machine learning model for generating reliably conservative predictions based on time series data, in accordance with an embodiment. System 400 may generate one or more of the user interfaces (e.g., as described in FIGS. 1-2) and may be used for generating predictions for financial services and/or asset values. For example, the system may generate the predictions subject to a conservative constraint that is imposed by minimizing a loss function while imposing a penalty for overestimation. For example, the system may select a loss function that is more robust to outliers (e.g., such as a mean absolute error) that is calculated as the average of the absolute difference between the actual and predicted values.

In some embodiments, the conservative constraint may be measured by minimizing a loss function based on mean absolute error or root mean. In some embodiments, generating the predictions subject to the conservative constraint may comprise imposing an upper bound on over-estimation frequency and an upper bound on a maximum over-estimation value. By doing so, the system may ensure a limit on the frequency and maximum values of overestimation. Thus, the system is trained to generate conservative estimates as opposed to merely applying conservative constraints to conventional models.

System 400 includes feature input 410. The system may select a feature input (and feature input format) that preserves the relationship between the inputs and the outputs that that system aims to predict. For example, the system may use date time features, which includes components of the time step itself for each observation, lag features, which are values at prior time steps, and/or window features, which are a summary of values over a fixed window of prior time steps. The system may further select the feature input and/or format based on the algorithm of a model component into which the feature input is being inputted, placement in system 400 of the model component, and/or level in the overall architecture of system 400.

For example, system 400 may be divided into various levels (or layers). The system may process feature inputs at each layer substantially simultaneously and/or in parallel. Additionally or alternatively, the feature input and/or layers may be divided based on processing power of individual devices with a networked system. For example, individual devices may be used to process data for a given model and/or model component. For example, the system may place different components of a model onto different devices and implement the forward method accordingly to move intermediate outputs across devices. As only part of a model operates on any individual device, a set of devices can collectively serve a larger model. Additionally or alternatively, the system may use a data parallel approach, in which feature inputs are replicated across the same model to multiple devices, where each device consumes a different partition of the feature input data.

As shown in system 400, feature input 410 is input into model component 420 and model component 430. Is should be noted that in some embodiments, model component 420 and model component 430 may themselves comprise one or more machine learning and/or artificial intelligence (which are referred to collectively as "machine learning models") based models. Model component 420 may be a mean-based regression model that determines the strength and character of the relationship between one dependent variable and a series of other variables (e.g., independent variables). For example, system 400 may use a training dataset to train model component 420 to determine a line (e.g., a linear or curved) of best fit based on the dataset. Model component 420 may then be used to predict the dependent variable of the testing dataset. The predicted values may be compared to the original dependent variable values by using different accuracy measures like R-squared, root mean square error, root mean average error, and/or Pearson correlation coefficient. It should also be noted that in some embodiments, model component 420 may perform regression using two or more independent variables to predict the values of dependent variable. In such cases, model component 420 may use multiple lines (e.g., linear or curved) of best fit to obtain a general equation from the training dataset, which can then be used to predict the values of the testing dataset. Model component 420 generates outputs that are used as inputs into model component 440 and model component 450. The output of model component 420 may comprise a point estimate. For example, the point estimation of the dataset may represent a single value of an unknown population parameter (e.g., a population mean, mean absolute error, and/or root mean).

Model component 430 may be a quantile regression model. System 400 may use model component 430 to understanding relationships between variables outside of the mean of the dataset. For example, model component 420 may fit predictive models using regression based on mean squared error; however, model component 430 does not indicate how varied the residuals (e.g., how well a line fits an individual data point) are. To compensate, system 400 inputs feature input 410 into model component 430, which may use quantile regression to change a mean squared error loss function to one that predicts conditional quantiles rather than conditional means. While quantile prediction intervals may be subject to overfitting, model component 430 may, in some embodiments, use confidence intervals around the quantile predictions. Model component 430 may determine a low interval (e.g., a prediction interval from a lower prediction limit to a center of the distribution) and generate an output based on the low internal. For example, the output of model component 430 may be used to generate a new feature input that is then input into model component 460.

System 400 also includes model component 440, model component 450, and model component 460. Is should be noted that in some embodiments, model component 440, model component 450, and model component 460 may themselves comprise one or more machine learning models. For example, model component 440 may determine a downward shift for a point estimate, and the downward shift may be subject to a floor. For example, model component 440 may create a systematic shift with a point-estimate that allows the mean-centered predictions to be moved downwards, thus creating conservative estimates. In some embodiments, model component 440 may subject the point estimate to a floor (e.g., based on a business threshold).

Model component 450 may determine a standard deviation for past values of the point estimate. For example, model component 450 may determine a standard deviation for lagged values (e.g., values from a previous time step in the time series data). Model component 460 may receive an input that is based on an output of model component 430. Model component 460 may perform a quantile regression to generate an output. The outputs of model component 440, model component 450, and model component 460 may then be used to generate a feature input into model component 470.

For example, model component 470 uses an algorithm that automates the search for best ensemble of conservative prediction based on the training dataset. In some embodiments, model component 470 may use the following algorithm:

$$\hat{y}_i(\theta): A*\max[(\text{PointEstimate}-\text{shift}),\text{floor}]+B*\max([STD,\text{floor}])*\text{multi}+C*\text{Quantile}$$

For example, through the use of the aforementioned algorithm, model component 470 generates a conservative prediction. In this embodiment, yi: corresponds to an actual value for the conservative prediction. "A", "B", and "C" correspond to parameter weights (e.g., weights applied to model component 440, model component 450, and model component 460). "Shift" and "floor" may correspond shifted and floored amounts based on model component 440. "PointEstimate" may correspond to the output of model component 440. "STD" may correspond to the output of model component 450. "Quantile" may correspond to the output of model component 460. Additionally, "multi" may correspond to a historical error magnification multiplier.

System 400 may minimize a loss function while imposing penalty on overestimation. For example, system 400 may minimize:

$$L(\theta) = \frac{1}{N}\sum_{i=1}^{N}\lfloor \hat{y}_i(\theta) - y_i \rfloor$$

The loss function may be subject to constraints based on an upper bound for over-estimation frequency (e.g., "threshold1") and an upper bound on max over-estimation value ("threshold2"):

$$\sum_{i=1}^{N} D(o_i) < \text{threshold1}$$

$$\max_i o_i < \text{threshold2}$$

In some embodiments, system 400 may also impose an optimal parameter set that minimizes loss function while satisfying the constraints:

$$\theta^* = \arg\min L(\theta)$$

As referred to above, θ may corresponds to all parameters including "A", "B", "C", "multi", "shift" and "floor." Accordingly, the system may tune each of these parameters. System 400 may also determine an overestimation amount according to:

$$o_i = \max(\hat{y}_i(\theta) - y_i, 0)$$

Finally, $D(o_i)$ may correspond to a dummy function that takes value 1 if $o_i > 0$ and 0 otherwise.

System 400 may then generate a prediction based on output 480 of model component 470. System 400 may then populate a user interface (e.g., user interface 100 (FIG. 1))

based on the output. For example, the system may determine hyperparameters for the model based on the weights attributed to each model component (e.g., "A", "B", and "C"). The system may iteratively refine the model by sequentially running the model and updating the model based on the results (e.g., to generate lower error predictions).

Figure 5:
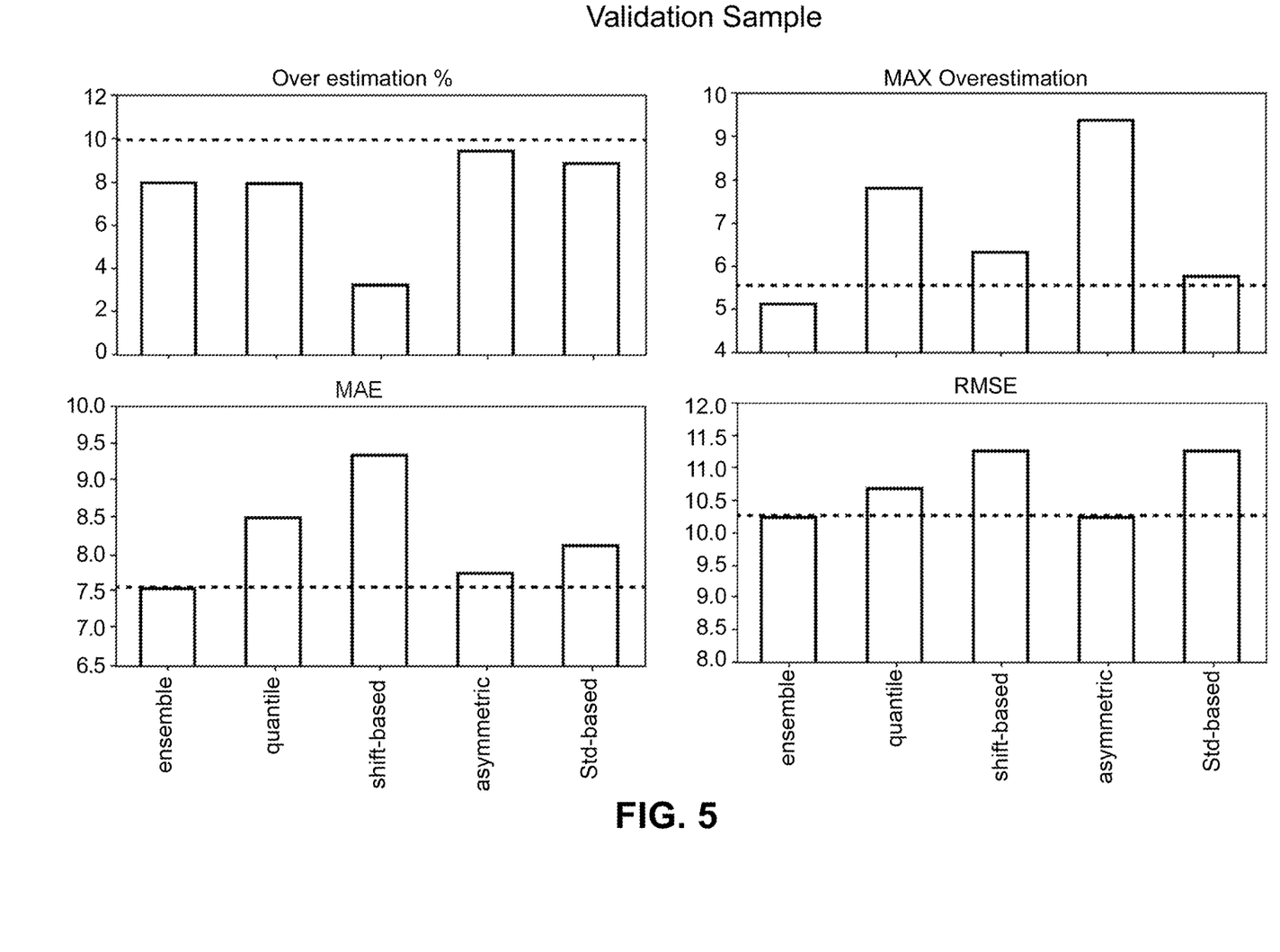
FIG. 5 depicts a diagram that illustrates the conservative prediction results based on time series data in a validation sample, in accordance with an embodiment.

FIG. 5 depicts a diagram that illustrates the conservative prediction results based on time series data in a validation sample, in accordance with an embodiment. For example, FIG. 5 shows a comparative analysis of an over-estimation frequency (e.g., "over estimation %") and an over-estimation value (e.g., "MAX overestimation") for the ensemble machine learning model described herein as compared to conventional systems in the upper left hand and upper right hand charts, respectively. Additionally, the charts in the upper left hand and upper right hand show example constraints (e.g., a business constraint for conservative predictions) used for the analysis (e.g., the dotted line). Per the constraints, the results of each algorithm should not exceed business thresholds (i.e., the dotted line). The lower left hand and lower right hand chart indicate accuracy metrics both in terms of mean absolute error ("MAE") and root mean square error ("RMSE"). Per the constraints, the lower the accuracy metrics shown in the charts the more accurate the model. As shown in FIG. 5, the optimal parameters are applied on test sample. The system then determines which approaches in the testing sample satisfy the constraints, and the system determines which one minimizes error metrics in testing sample. The system then applies the results to the validation sample as shown in FIG. 6.

Figure 6:
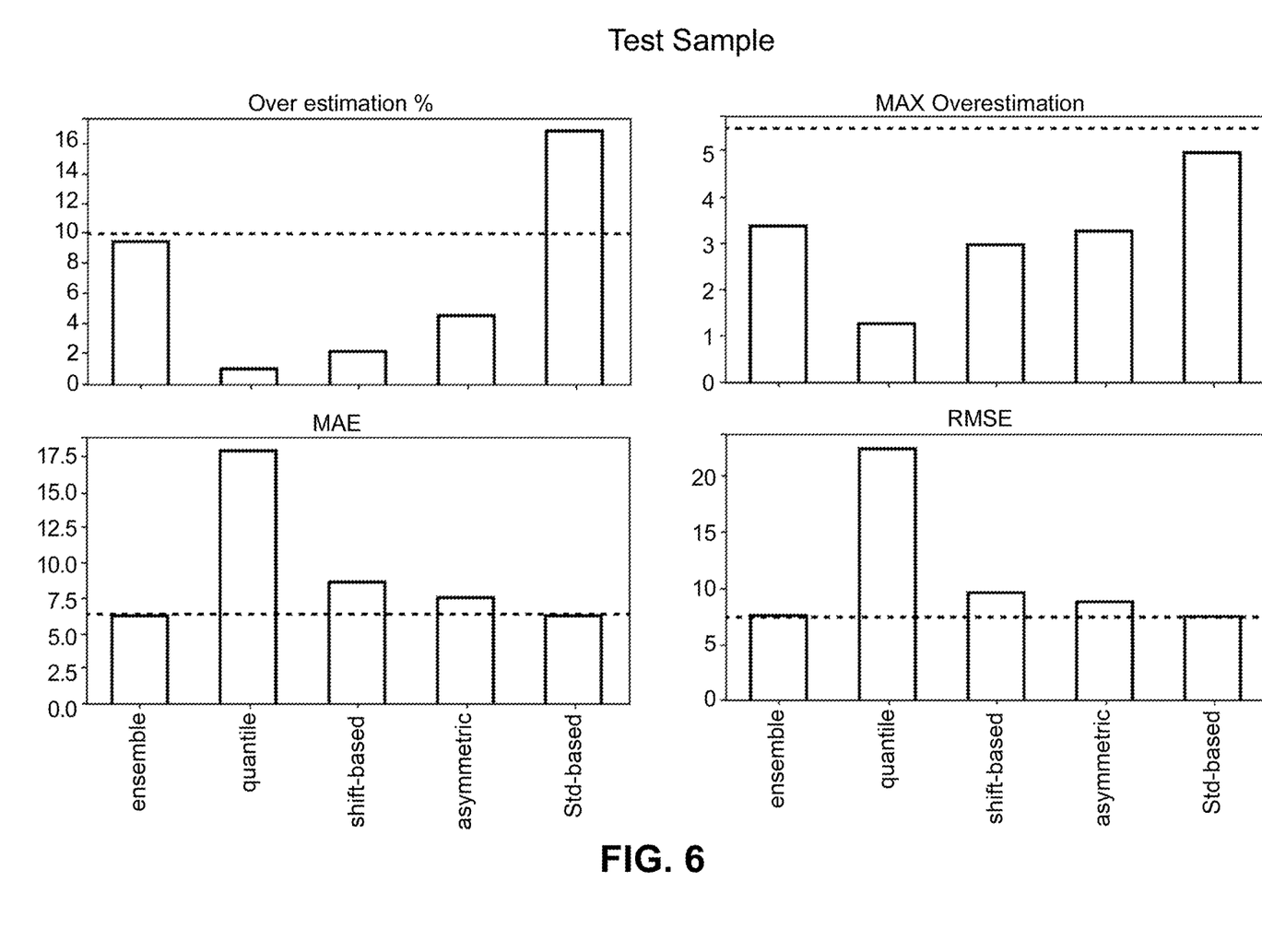
FIG. 6 depicts a diagram that illustrates the conservative prediction results based on time series data in a validation sample, in accordance with an embodiment.

FIG. 6 depicts a diagram that illustrates the conservative prediction results based on time series data in a validation sample, in accordance with an embodiment. For example, FIG. 6 shows a comparative analysis of an over-estimation frequency (e.g., "over estimation %") and an over-estimation value (e.g., "MAX overestimation") for the ensemble machine learning model described herein as compared to conventional systems in the upper left hand and upper right hand charts, respectively. Additionally, the charts in the upper left hand and upper right hand show example constraints (e.g., a business constraint for conservative predictions) used for the analysis (e.g., the dotted line). Per the constraints, the results of each algorithm should not exceed business thresholds (i.e., the dotted line). The lower left hand and lower right hand chart indicate accuracy metrics both in terms of mean absolute error ("MAE") and root mean square error ("RMSE"). For example, RMSE penalizes larger errors, whereas MAE treats errors the same. Per the constraints, the lower the accuracy metrics shown in the charts the more accurate the model.

As shown in both FIGS. 5-6, the ensemble machine learning model outperforms the conventional systems. For example, as shown in FIGS. 5-6, the RMSE and MAE metrics for the ensemble machine learning model are lower than the conventional systems. Additionally, the RMSE and MAE metrics for ensemble machine learning model conform to a constraint (e.g., the dotted line). Similarly, the ensemble machine learning model abides by the over-estimation frequency and the over-estimation value constraints (unlike the conventional systems). For example, as shown in FIGS. 5-6 the ensemble machine learning model searches for optimal parameters using validation set to ensure the constraints are satisfied and error metrics are minimized in validation sample.

Figure 7:
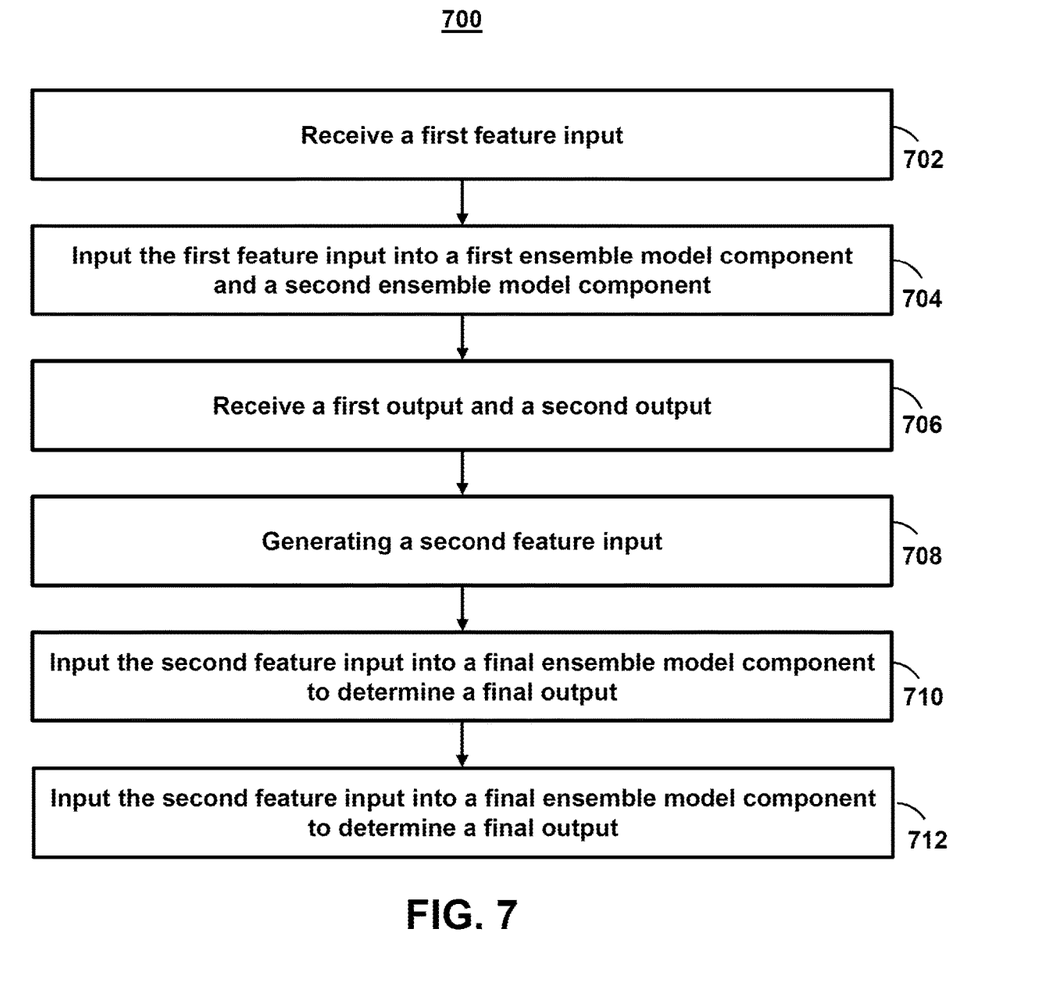
FIG. 7 depicts a process for generating reliably conservative predictions based on time series data in energy use embodiments, in accordance with an embodiment.

FIG. 7 depicts a process for generating reliably conservative predictions based on time series data in energy use embodiments, in accordance with an embodiment. For example, FIG. 7 shows process 700, which may be implemented by one or more devices. The system may implement process 700 in order to generate one or more of the user interfaces (e.g., as described in FIGS. 1-2). For example, process 700 may describe a process for generating predictions for financial services and/or asset values.

At step 702, process 700 (e.g., using control circuitry and/or one or more components described in FIGS. 1-3) receives a first feature input. For example, the system may receive a first feature input, wherein the first feature input represents a first set of times series data. For example, the system may generate the predictions subject to a conservative constraint that is imposed by minimizing a loss function while imposing a penalty for overestimation. For example, the system may select a loss function that is more robust to outliers (e.g., such as a mean absolute error) that is calculated as the average of the absolute difference between the actual and predicted values. For example, in some embodiments, the conservative constraint may be measured by minimizing a loss function based on mean absolute error or root mean. In some embodiments, generating the predictions subject to the conservative constraint may comprise imposing an upper bound on over-estimation frequency and an upper bound on a maximum over-estimation value. By doing so, the system may ensure a limit on the frequency and maximum values of overestimation. Thus, the system is trained to generate conservative estimate.

At step 704, process 700 (e.g., using control circuitry and/or one or more components described in FIGS. 1-3) inputs the first feature input into a first ensemble model component and a second ensemble model component. For example, the system may input the first feature input into a first ensemble model component and a second ensemble model component, wherein the first ensemble model component is a mean-based regression model, and wherein the second ensemble model component is a quantile regression model.

At step 706, process 700 (e.g., using control circuitry and/or one or more components described in FIGS. 1-3) receives a first output and a second output. For example, the system may receive a first output from the first ensemble model component and a second output from the second ensemble model component. In some embodiments, the first output may be based on a point estimate based on the first feature input. For example, the system may determine a point estimate that involves the use of sample data to calculate a single value (or a series of values corresponding to different characteristics) which serve as a best estimate of a current and/or future value of time series data. The system may generate a feature input (e.g., for another ensemble model component) based on this value. Additionally or alternatively, the second output is based on a lower tail distribution of a quantile regression. For example, the quantile regression may provide a distribution of values. The system may use the lower values in a distribution (e.g., corresponding to the lower tail) to generate a new feature input (e.g., for another ensemble model component) based on this distribution of values.

At step 708, process 700 (e.g., using control circuitry and/or one or more components described in FIGS. 1-3) generates a second feature input. For example, the system may generate a second feature input based on the first output and the second output. For example, as with the generation of the first feature input (e.g., in step 702 above), the system generates input variables as new input features from the time series dataset. The system may select a feature input (and feature input format) that preserves the relationship between the inputs and the outputs that that system aims to predict. For example, the system may use date time features, which includes components of the time step itself for each observation, lag features, which are values at prior time steps, and/or window features, which are a summary of values over a fixed window of prior time steps.

At step 710, process 700 (e.g., using control circuitry and/or one or more components described in FIGS. 1-3) inputs the second feature input into a final ensemble model component to determine a final output. For example, the system may input the second feature input into a final ensemble model component to determine a final output, wherein the final ensemble model component comprises a plurality of ensemble model components used to generate predictions subject to a conservative constraint. In some embodiments, the final ensemble model component may comprise an algorithm that automates the search for best ensemble of conservative prediction based on training dataset. For example, the system may have received a second feature input, wherein the second feature input represents a second set of time series data. The system may have generated a plurality of samples based on cross-validation resampling of the second set of time series data. The ensemble machine learning model may be trained based on the plurality of samples to determine the most accurate ensemble machine learning model based on output from the ensemble model components.

For example, the final ensemble model component may determine a final output by iteratively searching outputs of other ensemble model component and/or feeding those outputs back into itself to further minimize errors in prediction. For example, based on regression model mean-based forecasts and quantile-based forecasts with respect to desirable over-estimation constraints, the system determines an algorithm for generating the reliably conservative predictions. For example, the system may Bayesian optimization at the final ensemble model component to determine weights (e.g., determine parameters based on model component training) for the various other model components and/or hyperparameters (e.g., hyperparameters introduce externally to tune the model). For example, the system may minimize and error rate (e.g., in RSME or MSE as described in FIG. 5-6) as validated on a validation set.

The system may determine a set of hyperparameters that provides the lowest error for given constraints. For example, the system may iteratively run trials one after another, each time improving the selected hyperparameters by applying Bayesian reasoning (e.g., based on Gaussian Processes, Random Forest Regressions, and/or Tree Parzen Estimators ("TPE")) and updating the model.

For example, the system may use weights for each of the plurality of ensemble models. For example, the system may determine respective weights for each of the plurality of ensemble models. The system may then apply the respective weights to the final model component as parameters. For example, the use of weights on the ensembles allows the contribution of each ensemble component to the prediction to be weighted proportionally to the trust, importance, and/or performance of the member on a holdout dataset. For example, the ensemble prediction may be calculated as the average of the ensemble model component contributions to the predictions. In the case of predicting a class label, the prediction is calculated as the mode of the ensemble model component predictions. In the case of predicting a class probability, the prediction may be calculated as the argmax of the summed probabilities for each class label. A weighted ensemble is an extension of a model averaging ensemble where the contribution of each member to the final prediction is weighted by the performance of the model. For example, the model weights may be small positive values and the sum of all weights equals one, allowing the weights to indicate the percentage of trust, importance, and/or performance from each ensemble model component.

In some embodiments, generating the second feature input based on the first output and the second output further comprise input from the first and second output into additional ensemble model components. These ensemble model components may themselves be individually trained (and/or trained in parallel) machine learning models, each with individually assigned constraints, algorithms, parameters, and/or functions. For example, the system may generate, based on the first output, a third feature input and a fourth feature input. The system may then input the third feature input into a third ensemble model component to determine a third output, wherein the third ensemble model component determines a downward shift for a point estimate, and wherein the downward shift is subject to a floor. The system may input the fourth feature input into a fourth ensemble model component to determine a fourth output, wherein the fourth ensemble model component determines a standard deviation for past values of the point estimate.

Additionally or alternatively, generating the second feature input based on the first output and the second output may comprise the system generating, based on the second output, a fifth feature input and inputting the fifth feature input into a fifth ensemble model component to determine a fifth output. For example, the fifth ensemble model performs a quantile regression. For example, the second output may be based on a lower distribution of the second ensemble model. The system may then process this input and perform a second quantile regression on the input.

Additionally or alternatively, generating the second feature input based on the first output and the second output may comprise the system generating the second feature input based on the first output and, the second output further comprises generating respective outputs from the plurality of ensemble model components, wherein inputs for the plurality of ensemble model components comprise the first output or the second output determining the second feature input based on their respective outputs. For example, generating the second feature input may comprise using the final model component to determine a final output based on the outputs from the third ensemble model, fourth ensemble model, and/or fifth ensemble model.

At step 712, process 700 (e.g., using control circuitry and/or one or more components described in FIGS. 1-3) inputs the second feature input into a final ensemble model component to determine a final output. For example, the system may generate for display, on a user interface (e.g., user interface 100 (FIG. 1)), a prediction based on the final output. For example, the system may generate a prediction of a current and/or future value of an asset based on inputted time series data (e.g., as described in FIG. 2).

It is contemplated that the steps or descriptions of FIG. 7 may be used with any other embodiment of this disclosure. In addition, the steps and descriptions described in relation to FIG. 7 may be performed in alternate orders, or in parallel to further the purposes of this disclosure. For example, each of these steps may be performed in any order, in parallel, or simultaneously to reduce lag, or increase the speed of the system or method. Furthermore, it should be noted that any of the devices or equipment discussed in relation to FIGS. 1-4 could be used to perform one of more of the steps in FIG. 7.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving a first feature input; inputting the first feature input into a first machine learning model and a second machine learning model; receiving a first output from the first machine learning model, and a second output from the second machine learning model; generating a second feature input based on the first output and the second output; inputting the second feature input into a third machine learning model to determine a third output; and generating for display, on a user interface, a prediction based on the third output.
2. A method for using an ensemble machine learning model to generate reliably conservative predictions based on time series data, the method comprising: receiving a first feature input, wherein the first feature input represents a first set of times series data; inputting the first feature input into a first ensemble model component and a second ensemble model component, wherein the first ensemble model component is a mean-based regression model, and the second ensemble model component is a quantile regression model; receiving a first output from the first ensemble model component and a second output from the second ensemble model component; generating a second feature input based on the first output and the second output; inputting the second feature input into a final ensemble model component to determine a final output, wherein the final ensemble model comprises a plurality of ensemble model components used to generate predictions subject to a conservative constraint; and generating for display, on a user interface, a prediction based on the final output.
3. The method of any one of the preceding claims, wherein the first output is based on a point estimate based on the first feature input, and wherein the second output is based on a lower tail distribution of a quantile regression.
4. The method of any one of the preceding claims, wherein generating the predictions subject to the conservative constraint comprises minimizing a loss function while imposing a penalty for overestimation.
5. The method of any one of the preceding claims, further comprising: determining respective weights for each of the plurality of ensemble models; and applying the respective weights to the final model component as parameters.
6. The method of any one of the preceding claims, wherein generating the predictions subject to the conservative constraint further comprises imposing an upper bound on over-estimation frequency, and an upper bound on a maximum over-estimation value.
7. The method of any one of the preceding claims, wherein generating the second feature input based on the first output and the second output further comprises: generating, based on the first output, a third feature input and a fourth feature input; inputting the third feature input into a third ensemble model component to determine a third output, wherein the third ensemble model component determines a downward shift for a point estimate, and wherein the downward shift is subject to a floor; and inputting the fourth feature input into a fourth ensemble model component to determine a fourth output, wherein the fourth ensemble model component determines a standard deviation for past values of the point estimate.
8. The method of any one of the preceding claims, wherein generating the second feature input based on the first output and the second output further comprises: generating, based on the second output, a fifth feature input; and inputting the fifth feature input into a fifth ensemble model component to determine a fifth output.
9. The method of any one of the preceding claims, wherein generating the second feature input based on the first output and the second output further comprises: generating respective outputs from the plurality of ensemble model components, wherein inputs for the plurality of ensemble model components comprise the first output or the second output; and determining the second feature input based on the respective outputs.
10. The method of any one of the preceding claims, wherein the conservative constraint is measured by minimizing a loss function based on mean absolute error or root mean squared error.
11. The method of any one of the preceding claims, further comprising: receiving a second feature input, wherein the second feature input represents a second set of time series data; generating a plurality of samples based on cross-validation resampling of the second set of time series data; and training the ensemble machine learning model based on the plurality of samples.
12. A tangible, non-transitory, machine-readable medium storing instructions that, when executed by a data processing apparatus, cause the data processing apparatus to perform operations comprising those of any of embodiments 1-11.
13. A system comprising: one or more processors and memory storing instructions that, when executed by the processors, cause the processors to effectuate operations comprising those of any of embodiments 1-11.
14. A system comprising means for performing any of embodiments 1-11.

What is claimed is:

1. A system for using an ensemble machine learning model to generate predictions based on time series data, the system comprising:
cloud-based storage circuitry configured to store the ensemble machine learning model, wherein the ensemble machine learning model is trained on a plurality of samples of time series data, wherein the plurality of samples of time series data is generated based on cross-validation resampling;
control circuitry configured to:
receive a first feature input, wherein the first feature input represents a first set of times series data;
input the first feature input into a first ensemble model component and a second ensemble model component, wherein the first ensemble model component is a mean-based regression model, and wherein the second ensemble model component is a quantile regression model;

receive a first output from the first ensemble model component and a second output from the second ensemble model component, wherein the first output is based on a point estimate based on the first feature input, and wherein the second output is based on a lower tail distribution of a quantile regression;

generate a second feature input based on the first output and the second output, wherein generating the second feature input based on the first output and the second output further comprises:

generating a plurality of respective outputs from a plurality of ensemble model components, wherein respective inputs for the plurality of ensemble model components comprise the first output or the second output; and determining the second feature input based on the respective outputs;

input the second feature input into a final ensemble model component to determine a final output, wherein the final ensemble model component comprises the plurality of ensemble model components used to generate predictions subject to a constraint; and input/output circuitry configured to generate for display, on a user interface, a prediction based on the final output.

2. A method for using an ensemble machine learning model to generate predictions based on time series data, the method comprising:

receiving a first feature input, wherein the first feature input represents a first set of times series data;

inputting the first feature input into a first ensemble model component and a second ensemble model component, wherein the first ensemble model component is a mean-based regression model, and wherein the second ensemble model component is a quantile regression model;

receiving a first output from the first ensemble model component and a second output from the second ensemble model component;

generating a second feature input based on the first output and the second output;

inputting the second feature input into a final ensemble model component to determine a final output, wherein the final ensemble model component comprises a plurality of ensemble model components used to generate predictions subject to a constraint, and wherein generating the predictions subject to the constraint comprises imposing an upper bound on over-estimation frequency and an upper bound on a maximum overestimation value; and generating for display, on a user interface, a prediction based on the final output.

3. The method of claim 2, wherein the first output is based on a point estimate based on the first feature input, and wherein the second output is based on a lower tail distribution of a quantile regression.

4. The method of claim 2, wherein generating the predictions subject to the constraint comprises minimizing a loss function while imposing a penalty for overestimation.

5. The method of claim 2, further comprising:

determining respective weights for each of the plurality of ensemble model components; and applying the respective weights to the final ensemble model component as parameters.

6. The method of claim 2, wherein generating the second feature input based on the first output and the second output further comprises:

generating, based on the first output, a third feature input and a fourth feature input;

inputting the third feature input into a third ensemble model component to determine a third output, wherein the third ensemble model component determines a downward shift for a point estimate, and wherein the downward shift is subject to a floor; and inputting the fourth feature input into a fourth ensemble model component to determine a fourth output, wherein the fourth ensemble model component determines a standard deviation for past values of the point estimate.

7. The method of claim 6, wherein generating the second feature input based on the first output and the second output further comprises:

generating, based on the second output, a fifth feature input; and inputting the fifth feature input into a fifth ensemble model component to determine a fifth output, wherein the fifth ensemble model component performs a quantile regression.

8. The method of claim 2, wherein generating the second feature input based on the first output and the second output further comprises:

generating a plurality of respective outputs from the plurality of ensemble model components, wherein respective inputs for the plurality of ensemble model components comprise the first output or the second output; and determining the second feature input based on the respective outputs.

9. The method of claim 2, wherein the constraint is measured by minimizing a loss function based on mean absolute error or root mean squared error.

10. The method of claim 2, further comprising:

receiving a second feature input, wherein the second feature input represents a second set of time series data;

generating a plurality of samples based on cross-validation resampling of the second set of time series data; and training the ensemble machine learning model based on the plurality of samples.

11. A non-transitory, computer-readable medium for generating hierarchical data structures based on crowdsourced data featuring non-homogenous metadata, comprising instructions that, when executed by one or more processors, cause operations comprising:

receiving a first feature input, wherein the first feature input represents a first set of times series data;

inputting the first feature input into a first ensemble model component and a second ensemble model component, wherein the first ensemble model component is a mean-based regression model, and wherein the second ensemble model component is a quantile regression model;

receiving a first output from the first ensemble model component and a second output from the second ensemble model component;

generating a second feature input based on the first output and the second output;

inputting the second feature input into a final ensemble model component to determine a final output, wherein the final ensemble model component comprises a plurality of ensemble model components used to generate predictions subject to a constraint, and wherein generating the predictions subject to the constraint comprises imposing an upper bound on over-estimation frequency and an upper bound on a maximum overestimation value; and generating for display, on a user interface, a prediction based on the final output.

12. The non-transitory, computer-readable medium of claim 11, wherein the first output is based on a point estimate based on the first feature input, and wherein the second output is based on a lower tail distribution of a quantile regression.

13. The non-transitory, computer-readable medium of claim 11, wherein generating the predictions subject to the constraint comprises minimizing a loss function while imposing a penalty for overestimation.

14. The non-transitory, computer-readable medium of claim 11, further comprising:
  determining respective weights for each of the plurality of ensemble model components; and
  applying the respective weights to the final ensemble model component as parameters.

15. The non-transitory, computer-readable medium of claim 11, wherein generating the second feature input based on the first output and the second output further comprises:
  generating, based on the first output, a third feature input and a fourth feature input;
  inputting the third feature input into a third ensemble model component to determine a third output, wherein the third ensemble model component determines a downward shift for a point estimate, and wherein the downward shift is subject to a floor; and
  inputting the fourth feature input into a fourth ensemble model component to determine a fourth output, wherein the fourth ensemble model component determines a standard deviation for past values of the point estimate.

16. The non-transitory, computer-readable medium of claim 15, wherein generating the second feature input based on the first output and the second output further comprises:
  generating, based on the second output, a fifth feature input; and
  inputting the fifth feature input into a fifth ensemble model component to determine a fifth output, wherein the fifth ensemble model component performs a quantile regression.

17. The non-transitory, computer-readable medium of claim 11, wherein generating the second feature input based on the first output and the second output further comprises:
  generating a plurality of respective outputs from the plurality of ensemble model components, wherein respective inputs for the plurality of ensemble model components comprise the first output or the second output; and
  determining the second feature input based on the respective outputs.

18. The non-transitory, computer-readable medium of claim 11, wherein the constraint is measured by minimizing a loss function based on mean absolute error or root mean squared error.

* * * * *